(12) United States Patent
Furuya et al.

(10) Patent No.: US 9,330,207 B2
(45) Date of Patent: May 3, 2016

(54) SUPPORT METHOD, RECORDING MEDIUM, AND DESIGN SUPPORT DEVICE TO CALCULATE A VOLUME OF A THREE-DIMENSIONAL MODEL

(71) Applicant: FUJITSU LIMITED, Kawasaki-shi, Kanagawa (JP)

(72) Inventors: Hiroyuki Furuya, Kawasaki (JP); Akihiro Otsuka, Yokohama (JP); Atsushi Yamaguchi, Kawasaki (JP); Akira Ueda, Yokohama (JP); Kazuhiro Nitta, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 454 days.

(21) Appl. No.: 13/658,862

(22) Filed: Oct. 24, 2012

(65) Prior Publication Data
US 2013/0151213 A1 Jun. 13, 2013

(30) Foreign Application Priority Data
Dec. 9, 2011 (JP) ................................. 2011-270123

(51) Int. Cl.
*G06G 7/48* (2006.01)
*G06F 17/50* (2006.01)

(52) U.S. Cl.
CPC ........ *G06F 17/5009* (2013.01); *G06F 2217/16* (2013.01)

(58) Field of Classification Search
CPC . G06F 17/50; G06F 17/5009; G06F 2217/16; G06T 17/00; G06T 17/20
See application file for complete search history.

(56) References Cited

U.S. PATENT DOCUMENTS

| | | | |
|---|---|---|---|
| 2006/0041404 A1* | 2/2006 | Ueda ................................. | 703/2 |
| 2007/0005314 A1 | 1/2007 | Ueda et al. | |
| 2007/0174028 A1* | 7/2007 | Tillman et al. ................... | 703/2 |
| 2010/0049489 A1* | 2/2010 | Tanaka .............................. | 703/9 |
| 2010/0204965 A1* | 8/2010 | Ide et al. .......................... | 703/1 |

FOREIGN PATENT DOCUMENTS

WO    WO2005/086034    9/2005

OTHER PUBLICATIONS

Multiphysics, C.O M.S.O L. "COMSOL Multiphysics User's Guide (Version 4.3)" COMSOL, AB (2012), pp. 39-40,48-49.*

* cited by examiner

*Primary Examiner* — Kandasamy Thangavelu
(74) *Attorney, Agent, or Firm* — Staas & Halsey LLP

(57) ABSTRACT

A design support method includes: executing by a computer operations of: moving, in an arbitrary direction, a first particle that is placed at a position in an internal space of a three-dimensional model of a design target and has a diameter of a size; recording a movement trace of the first particle; and calculating a volume of a first spatial region formed by the recorded movement trace.

18 Claims, 17 Drawing Sheets

FIG. 6

| MESH IDENTIFICATION NUMBER | MESH COORDINATES | | | COMPONENT SPACE IDENTIFICATION FLAG | MARKING FLAG | | | | | | WHETHER GENERATION OF PARTICLE IS RIGHT OR WRONG | | |
|---|---|---|---|---|---|---|---|---|---|---|---|---|---|
| | X | Y | Z | | MARK A | MARK B | MARK B1 | MARK B2 | MARK C | PARTICLE A | PARTICLE B | PARTICLE C |
| 1 | 0.0 | 0.0 | 0.0 | 0 | 0 | 0 | 0 | 0 | 0 | 0 | 0 | 0 |
| 2 | 0.0 | 0.1 | 0.1 | 1 | 1 | 1 | 0 | 0 | 0 | 1 | 1 | 0 |
| ... | ... | ... | ... | ... | ... | ... | ... | ... | ... | ... | ... | ... |
| 59 | 29.4 | 15.6 | 0.1 | 1 | 0 | 1 | 1 | 1 | 0 | 0 | 1 | 0 |
| ... | ... | ... | ... | ... | ... | ... | ... | ... | ... | ... | ... | ... |
| 223 | 493.0 | 223.8 | 149.1 | 1 | 0 | 1 | 1 | 0 | 1 | 0 | 1 | 1 |
| 224 | 493.0 | 223.8 | 223.8 | 0 | 0 | 0 | 0 | 0 | 0 | 0 | 0 | 0 |
| ... | ... | ... | ... | ... | ... | ... | ... | ... | ... | ... | ... | ... |

131

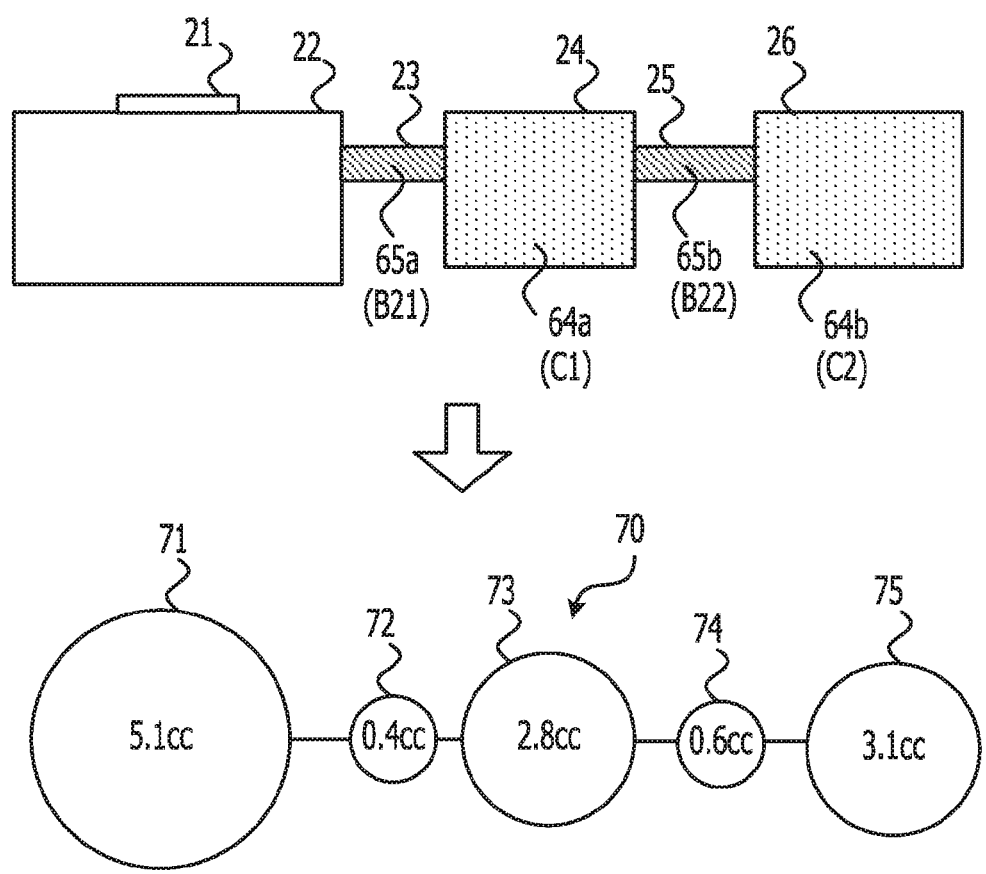

SUPPORT METHOD, RECORDING MEDIUM, AND DESIGN SUPPORT DEVICE TO CALCULATE A VOLUME OF A THREE-DIMENSIONAL MODEL

CROSS-REFERENCE TO RELATED APPLICATION(S)

This application is based upon and claims the benefit of priority of the prior Japanese Patent Application No. 2011-270123, filed on Dec. 9, 2011, the entire contents of which are incorporated herein by reference.

FIELD

The embodiments discussed herein are related to a design support method and a design support device.

BACKGROUND

The acoustic characteristics of acoustic products such as a speaker, a receiver, and a microphone in mobile terminal devices and the like change based on setting conditions. For example, in the speaker, a resonant frequency decreases and a sound volume on a low frequency side increases with an increase in the volume of the rear space (rear air chamber) of the speaker.

The volume of a space is obtained by a numerical analysis such as an electrothermal analysis, a mechanism analysis, or an electromagnetic field analysis for a structure. In the numerical analysis, for example, the numerical analysis is executed using a model for the numerical analysis that is generated by dividing the three-dimensional shape data of the structure into a large number of polyhedral elements using a predetermined mesh.

A related technique is disclosed in International Publication Pamphlet No. WO 2005/086034.

SUMMARY

According to one aspect of the embodiments, a design support method includes: executing by a computer operations of: moving, in an arbitrary direction, a first particle that is placed at a position in an internal space of a three-dimensional model of a design target and has a diameter of a size; recording a movement trace of the first particle; and calculating a volume of a first spatial region formed by the recorded movement trace.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an exemplary mesh management table;
FIG. 17 illustrates an exemplary processing of a design support device.

DESCRIPTION OF EMBODIMENTS

When a small space exists within a continuous space, even if a large space exists beyond the small space, the propagation of sound may be deteriorated under the influence of the increase of acoustic impedance or the like.

Figure 1:
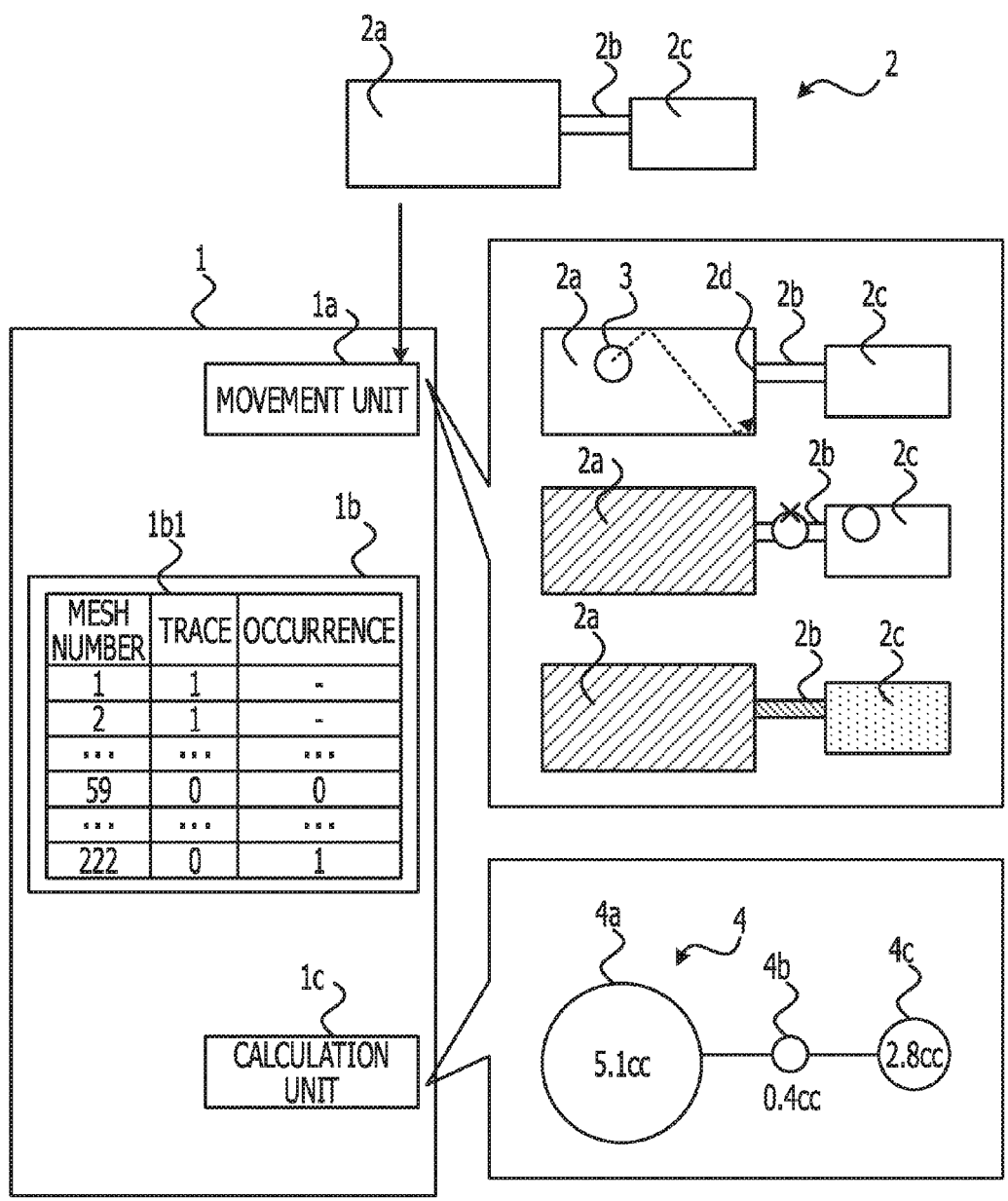
FIG. 1 illustrates an exemplary design support device.

FIG. 1 illustrates an exemplary design support device.

A design support device (computer) 1 includes a movement unit 1a, a storage unit 1b, and a calculation unit 1c. The movement unit 1a and the calculation unit 1c are executed by a Central Processing Unit (CPU) included in the design support device 1. The storage unit 1b may correspond to a data storage area provided in a Random Access Memory (RAM), a Hard Disk Drive (HDD), or the like included in the design support device 1.

The movement unit 1a receives a three-dimensional model 2 serving as a design target. The three-dimensional model 2 includes a first structure 2a, a joining portion 2b, and a second structure 2c. Each of the first structure 2a, the joining portion 2b, and the second structure 2c may be hollow. The first structure 2a and the second structure 2c are coupled to each other through the joining portion 2b. Each of the first structure 2a, the joining portion 2b, and the second structure 2c may be a rectangular parallelepiped. The first structure 2a and the second structure 2c may form a continuous space through the joining portion 2b. The surfaces of the first structure 2a, the joining portion 2b, and the second structure 2c are expressed using triangular shaped polygons.

The movement unit 1a places a spherical particle 3 at a specified position in the internal space of the first structure 2a. The diameter of the particle 3 may be set by, for example, a designer, and may specify the minimum diameter of one continuous space. The diameter of the particle 3 is greater than the cross-sectional area of the joining portion 2b. The shape of the particle 3 is not limited to a sphericity, and may be a polygon, for example.

The movement unit 1a moves the placed particle 3 in an arbitrary direction, and records therein a trace on the movement of the particle 3. For example, by generating a mesh (a solid such as a voxel or a tetrahedral shape) having a predetermined size in the internal spaces of the first structure 2a, the joining portion 2b and the second structure 2c, the movement unit is divides the internal spaces into a large number of meshes. When having moved the particle 3 in an arbitrary direction, the movement unit is creates a table 1b1 in which whether or not the particle 3 has been positioned in each divided mesh is recorded with respect to each mesh, and the movement unit 1a stores the table 1b1 in the storage unit 1b. Since the joining portion 2b is a rectangular parallelepiped, the diameter of the particle 3 is greater than the diameter of the cross-section of a connecting portion 2d between the first structure 2a and the joining portion 2b. The trace of the particle 3, obtained when the placed particle 3 has been moved in an arbitrary direction, remains within the first structure 2a. For example, when the diameter of the particle 3 is smaller than the cross-sectional area of the joining portion 2b, the trace of the particle 3 may span the whole range of the first structure 2a, the joining portion 2b, and the second structure 2c. Diagonal lines in FIG. 1 indicate a region where the particle 3 has been positioned in a divided mesh.

The table 1b1 includes the columns of a mesh number, a trace, and an occurrence. In the column of a mesh number, a number identifying the position of a mesh is set. For example, mesh numbers 1 and 2 in the table 1b1 may correspond to meshes formed in the first structure 2a, a mesh number 59 may correspond to a mesh formed in the joining portion 2b, and a mesh number 222 may correspond to a mesh formed in the second structure 2c. In the column of a trace, a value is set that indicates whether or not the particle 3 has been positioned in each divided mesh. For example, "1" is set in a mesh in which the particle 3 has been placed based on the movement of the particle 3, and "0" is set in a mesh in which the particle 3 has not been placed based on the movement of the particle 3.

The calculation unit 1c calculates the volume of a space formed based on the trace that has been recorded by the movement unit 1a. For example, the calculation unit 1c calculates the volume by multiplying the number of meshes in which "1" is set in the column of a trace in the table 1b1 by the volume of one mesh (unit volume). In FIG. 1, the trace of the particle 3 remains within the first structure 2a. Therefore, a volume calculated by the calculation unit 1c may be approximately equal to the volume of the first structure 2a.

Since it is possible to change the size of the particle 3 indicating a size recognized as one continuous space by a designer, the designer may easily recognize the range of a space greater than or equal to a specified size of the particle 3.

The design support device 1 creates a connection relationship diagram 4 among the first structure 2a, the joining portion 2b, and the second structure 2c. The movement unit 1a acquires, from among mesh numbers in the table 1b1, a mesh number in which a value in the column of a trace is set to "0". For example, mesh numbers are acquired that are positioned in the joining portion 2b and the second structure 2c. The movement unit is determines whether or not the particle 3 interferes with the inner peripheries of the joining portion 2b and the second structure 2c when the particle 3 has occurred on a mesh of each acquired mesh number. The movement unit 1a sets "0" in the column of an occurrence corresponding to a mesh number in which the particle 3 interferes with the inner periphery when the particle 3 has occurred on a mesh. In addition, the movement unit 1a sets "1" in the column of an occurrence corresponding to a mesh number in which the particle 3 does not interfere with the inner periphery when the particle 3 has occurred on a mesh.

When the movement unit 1a has finished determining whether or not interference occurs with respect to every mesh number in which "0" is set in the column of a trace, the calculation unit 1c refers to the table 1b1 and multiplies the number of meshes in which "0" is set in the column of an occurrence by the unit volume of a mesh. Therefore, a volume of the joining portion 2b is calculated. The calculation unit is refers to the table 1b1, and multiplies the number of meshes in which "1" is set in the column of an occurrence by the unit volume of a mesh. Therefore, the volume of the second structure 2c is calculated.

For example, the calculation unit 1c creates the connection relationship diagram 4 indicating the volumes of the first structure 2a, the joining portion 2b, and the second structure 2c and a connection relationship of the volumes. The sizes of regions 4a, 4b, and 4c illustrated in the connection relationship diagram 4 indicate the ratios of the volumes of the first structure 2a, the joining portion 2b, and the second structure 2c, respectively. Numbers within the regions 4a, 4b, and 4c indicate the volumes of the first structure 2a, the joining portion 2b, and the second structure 2c, respectively.

According to the design support device 1, it may be possible to easily recognize the range of a continuous space having a predetermined cross-sectional area or more. It may be possible to easily calculate the volume of the continuous space having a predetermined cross-sectional area or more. For example, compared with a method in which the connection relationship diagram 4 is created by obtaining the area of a spatial portion with respect to each cross-sectional view of the three-dimensional model 2, it may be possible to easily create a connection relationship diagram.

Figure 2:
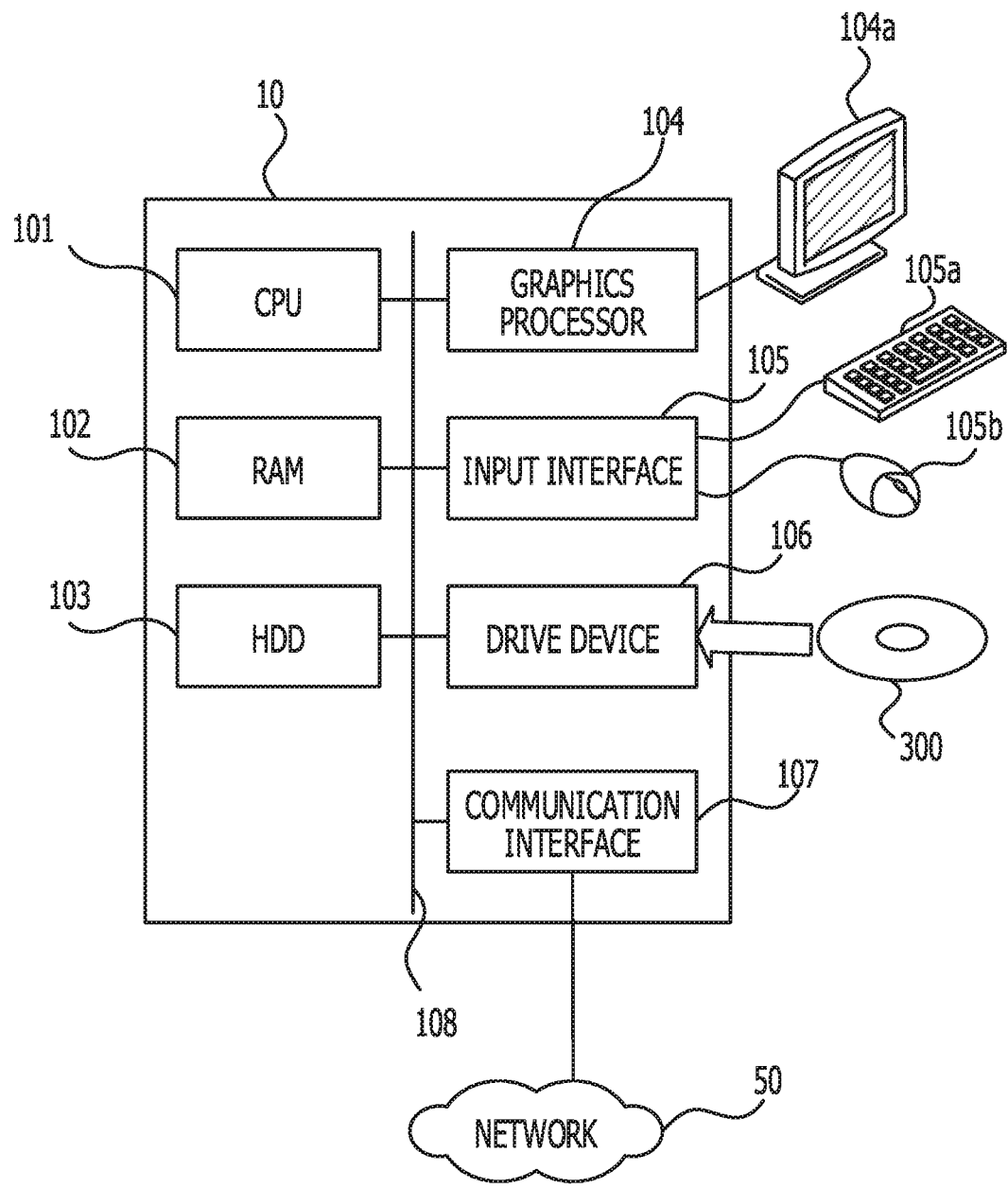
FIG. 2 illustrates an exemplary hardware configuration of a design support device.

FIG. 2 illustrates an exemplary hardware configuration of a design support device. In FIG. 2, the hardware configuration of the design support device may be illustrated.

A design support device 10 may be controlled by a CPU 101. A RAM 102 and a plurality of peripheral devices are coupled to the CPU 101 through a bus 108. The RAM 102 is used as the main storage device of the design support device 10. At least a portion of the program of an Operating System (OS) or an application program caused to be executed by the CPU 101 may be temporarily stored in the RAM 102. Various kinds of data used for processing performed by the CPU 101 may be stored in the RAM 102.

A hard disk drive 103, a graphics processor 104, an input interface 105, a drive device 106, and a communication interface 107 are coupled to the bus 108.

The hard disk drive 103 magnetically performs writing and reading of data on an embedded disk. The hard disk drive 103 may be used as the secondary storage device of the design support device 10. The program of the OS, an application program, and various kinds of data may be stored in the hard disk drive 103. As the secondary storage device, a semiconductor storage device such as a flash memory may be used.

A monitor 104a is coupled to the graphics processor 104. In accordance with an instruction from the CPU 101, the graphics processor 104 causes an image to be displayed in the screen of the monitor 104a. The monitor 104a may include a display device utilizing a Cathode Ray Tube (CRT), a liquid crystal display device, or the like.

A keyboard 105a and a mouse 105b are coupled to the input interface 105. The input interface 105 transmits, to the CPU 101, a signal transmitted from the keyboard 105a or the mouse 105b. The mouse 105b may be used as a pointing device, and a pointing device such as, for example, a touch panel, a tablet, a touch-pad, or a trackball may be used.

The drive device 106 reads data recorded in a portable recording medium such as an optical disk where data is read out by reflection of light or a Universal Serial Bus (USB) memory. For example, when the drive device 106 is an optical drive device, data stored in an optical disk 300 is read using laser light or the like. The optical disk 300 may include a Blu-ray (registered trademark), a Digital Versatile Disc (DVD), a DVD-RAM, a CD-ROM (Compact Disc Read Only Memory), a CD-R (Recordable)/RW (ReWritable), or the like.

The communication interface 107 is coupled to a network 50. Through the network 50, the communication interface 107 transmits and receives data to and from another computer or a communication device.

Figure 3:
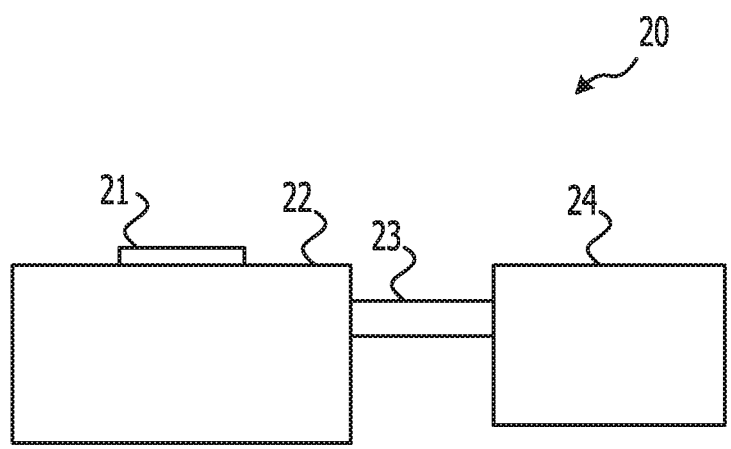
FIG. 3 illustrates an exemplary design target.

The design support device 10 calculates the joined state of the spatial volume of a 3D model serving as a design target. FIG. 3 illustrates an exemplary design target. A design target illustrated in FIG. 3 may be a 3D model.

In a 3D model 20 illustrated in FIG. 3, a hollow structure 22 is formed on a side opposite to an audio output unit of a speaker 21. The structure 22 may fill the role of a rear air chamber. A hollow structure 24 is joined to the structure 22 through a hollow structure 23. The structures 22, 23, and 24 may be rectangular parallelepipeds, and the structure 22 and the structure 24 form a continuous space through the structure 23. The surfaces of the structures 22, 23, and 24 may be triangular shaped polygons.

Figure 4:
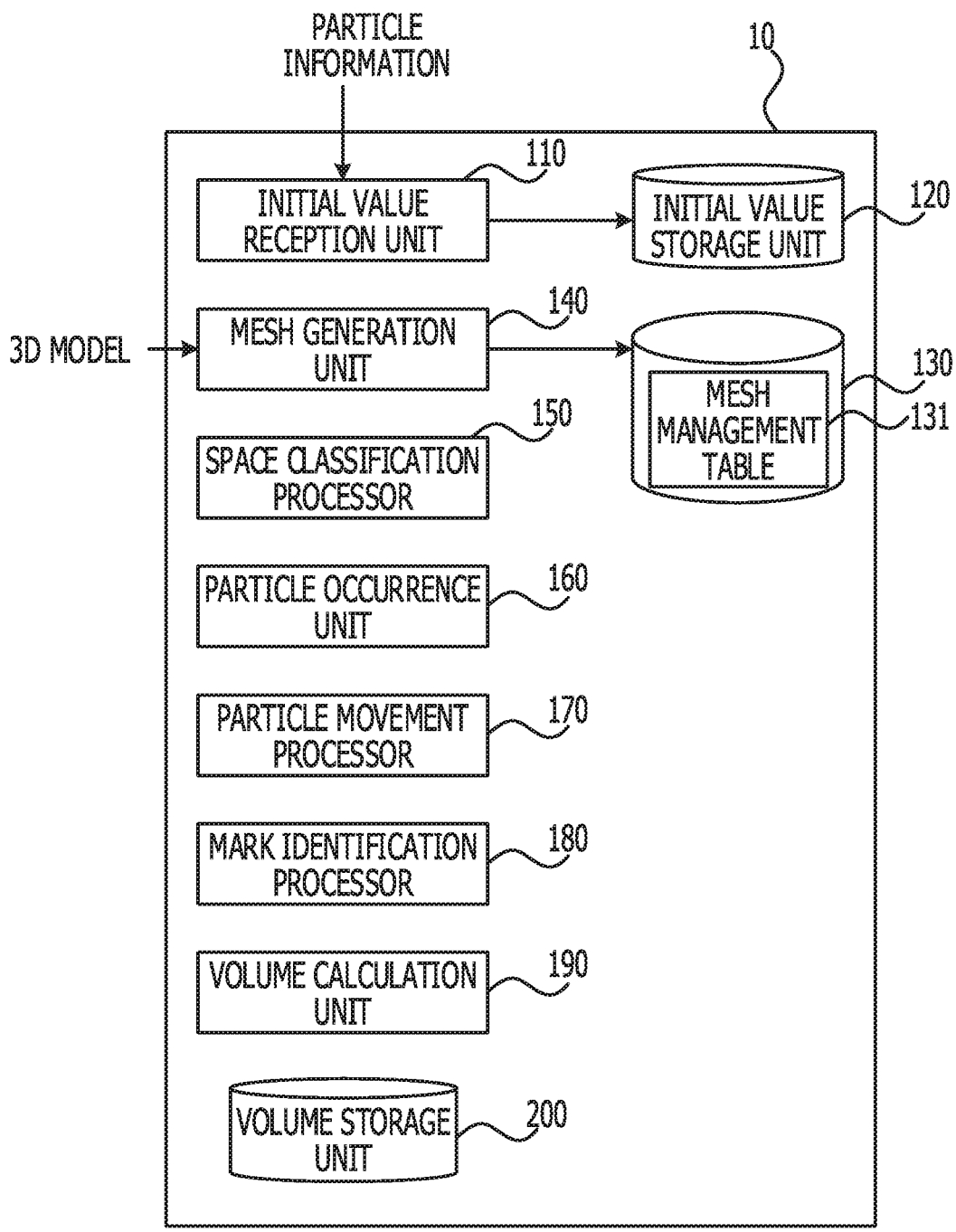
FIG. 4 illustrates an exemplary functional block of a design support device.

FIG. 4 illustrates an exemplary functional block of a design support device. A design support device 10 includes an initial value reception unit 110, an initial value storage unit 120, a management table storage unit 130, a mesh generation unit 140, a space classification processor 150, a particle occurrence unit 160, a particle movement processor 170, a mark identification processor 180, a volume calculation unit 190, and a volume storage unit 200.

The initial value reception unit 110 receives an initial value of particle information relating to a particle used when the volumes of the structures 22, 23, and 24 are calculated. The input particle information may include the size of a particle, the number of particles to be caused to occur, the movement time of a particle, a position at which a particle is to be caused to occur, the movement velocity of a particle, the shape of a particle, or the like. Each parameter of the particle information may be arbitrarily set by a designer. The initial value reception unit 110 stores the received initial value of the particle information in the initial value storage unit 120.

Figure 5:
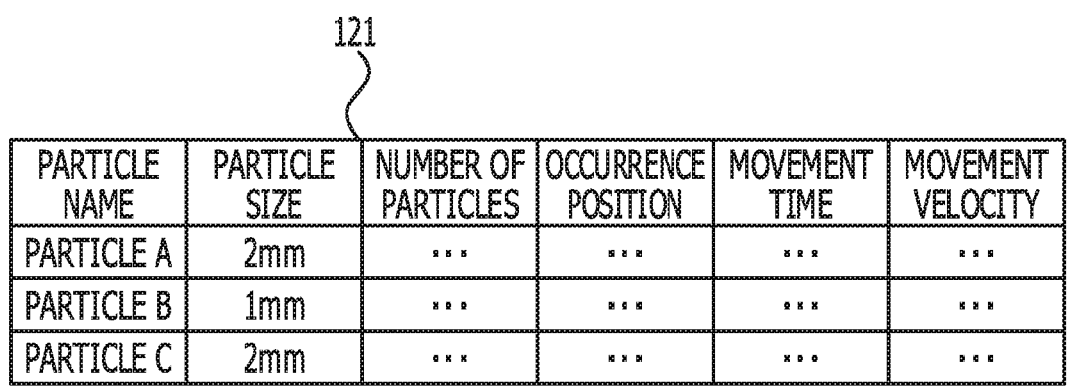
FIG. 5 illustrates exemplary particle information.

FIG. 5 illustrates an exemplary particle information. Particle information illustrated in FIG. 5 may be stored in an initial value storage unit. The particle information may be stored in table form. In a particle management table 121, the columns of a particle name, a particle size, the number of particles, an occurrence position, a movement time, and a movement velocity are set. Pieces of information arranged in a lateral direction are associated with one another.

In the column of a particle name, a name identifying a particle to be caused to occur by the particle occurrence unit 160 is set. In the column of a particle size, the size of a particle to be caused to occur by the particle occurrence unit 160 is set.

The size of a particle A may be set to a size in which a designer recognizes an area where the particle A is able to pass as one continuous area. For example, a space through which the particle A is not able to pass and a particle B is able to pass may be regarded as a space whose cross-sectional area is less than or equal to a predetermined value (for example, a joining portion).

The particle B sets, for example, a borderline where even if a particle smaller than the particle B passes through a space, it may be difficult to use the space as a rear air chamber. When a space exists through which neither of the particle A and the particle B is able to pass, an influence on a processing result may be reduced.

In the column of the number of particles, the number of particles to be caused to occur by the particle occurrence unit 160 is set. In the column of an occurrence position, the position of a particle to be caused to occur by the particle occurrence unit 160 is set. In the column of a movement time, a time is set during which the particle movement processor 170 moves a particle.

In the column of a movement velocity, a velocity is set at which the particle movement processor 170 moves a particle. In the management table storage unit 130 illustrated in FIG. 4, a mesh management table 131 is stored that manages data used when the joined state of a spatial volume is calculated. In the mesh management table 131, the processing results of the mesh generation unit 140, the space classification processor 150, the particle occurrence unit 160, and the particle movement processor 170 are stored.

Based on the input 3D model 20 serving as a design target, the mesh generation unit 140 generates a mesh in the 3D model 20. A designer specifies a division method (a voxel, a tetrahedral shape, or the like) for a mesh and the size of a mesh. As a method for creating a mesh, a well-known method may be used. The mesh generation unit 140 sets an identification number (mesh identification number) with respect to each created mesh. The mesh identification number is stored in the mesh management table 131 along with the position coordinates of each mesh.

When the ratio of a component to a volume within a mesh generated by the mesh generation unit 140 is greater than or equal to a setting value, the space classification processor 150 classifies the mesh into a component. When the ratio of a component to a volume within a mesh stored in the mesh management table 131 is less than a setting value, the space classification processor 150 classifies the mesh into a space. As a classification method, a well-known method may be used. The space classification processor 150 stores a classification result in the mesh management table 131.

Using the position coordinates of a mesh, which is stored in the mesh management table 131, and a particle occurrence position and a particle size, which are set in the particle management table 121, the particle occurrence unit 160 causes a particle to occur at a particle occurrence position. The particle occurrence unit 160 determines whether or not a particle interferes with a mesh serving as a component at the time of a particle occurrence. With respect to each specified size of a particle caused to occur, the presence or absence of interference is stored in the mesh management table 131.

During a particle movement time stored in the initial value storage unit 120, the particle movement processor 170 moves the particle caused to occur. When interference with a mesh serving as a component occurs, a movement direction is changed. So as to reduce continuing moving in the same location, the movement direction is changed based on a random function whose input is a time. When interference occurs, the movement direction may be modified using reflection. For example, not by causing an incidence angle and a reflection angle to be equal to each other but by slightly changing the reflection angle from the incidence angle based on a random function, the movement direction may be changed.

The particle movement processor 170 sets a mark for each particle size to a mesh on a movement path in the mesh management table 131. FIG. 6 illustrates an exemplary mesh management table.

In the mesh management table 131, the columns of a mesh identification number, mesh coordinates, a component space identification flag, a marking flag, and whether a particle is generated are provided. Pieces of information arranged in a lateral direction are associated with one another.

In the column of a mesh identification number, a mesh identification number identifying a mesh generated by the mesh generation unit 140 is set. In the column of mesh coordinates, coordinates identifying the position of a mesh is set.

In the column of a component space identification flag, a flag is set that identifies whether a mesh is to be recognized as a component or to be recognized as a space. For example, when the space classification processor 150 has classified the mesh as a component, "0" may be set. When the space classification processor 150 has classified the mesh as a space, "1" may be set.

In the column of a marking flag, information is set that identifies the region of a trace on the movement of a particle with respect to each of a plurality of mark types. For example, "1" may indicate that a particle has been positioned at a mark by the movement of a particle. For example, "0" may indicate that a particle has not been positioned at a mark by the movement of a particle.

In the column of whether the generation of a particle is right or wrong, information is set that indicates whether or not a particle has been generated. For example, when the particle occurrence unit 160 has caused a particle to occur, it is determined whether or not the particle having occurred interferes with a mesh serving as a component, and "1" is set with respect to a particle having interfered. "0" is set with respect to a particle not having interfered.

Using a flag set in the column of a marking flag in the mesh management table 131, the mark identification processor 180 illustrated in FIG. 4 identifies a 3D model to which a mark B1 is assigned.

Using the mesh management table 131, the volume calculation unit 190 creates a connection relationship diagram among the volumes of the structures 22, 23, and 24. The volume calculation unit 190 stores the created connection relationship diagram in the volume storage unit 200.

Figure 7:
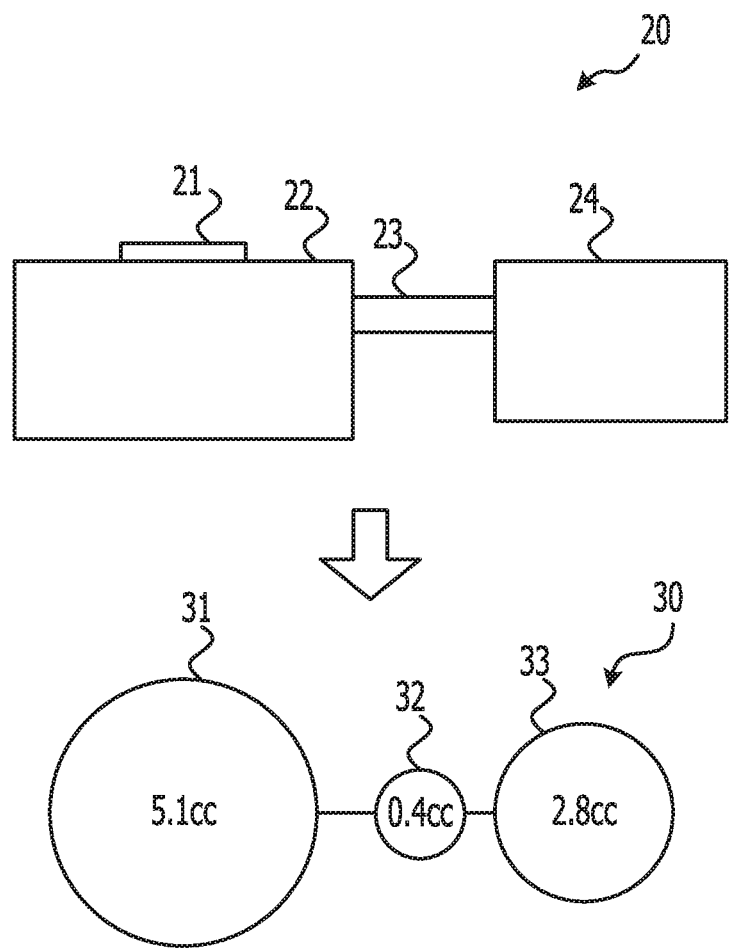
FIG. 7 illustrates an exemplary connection relationship.

FIG. 7 illustrates an exemplary connection relationship diagram. The sizes of regions 31, 32, and 33 in a connection relationship diagram 30 may indicate the ratios of the volumes of the structures 22, 23, and 24, respectively. Numbers within the regions 31, 32, and 33 may indicate the volumes of the structures 22, 23, and 24, respectively.

Figure 8:
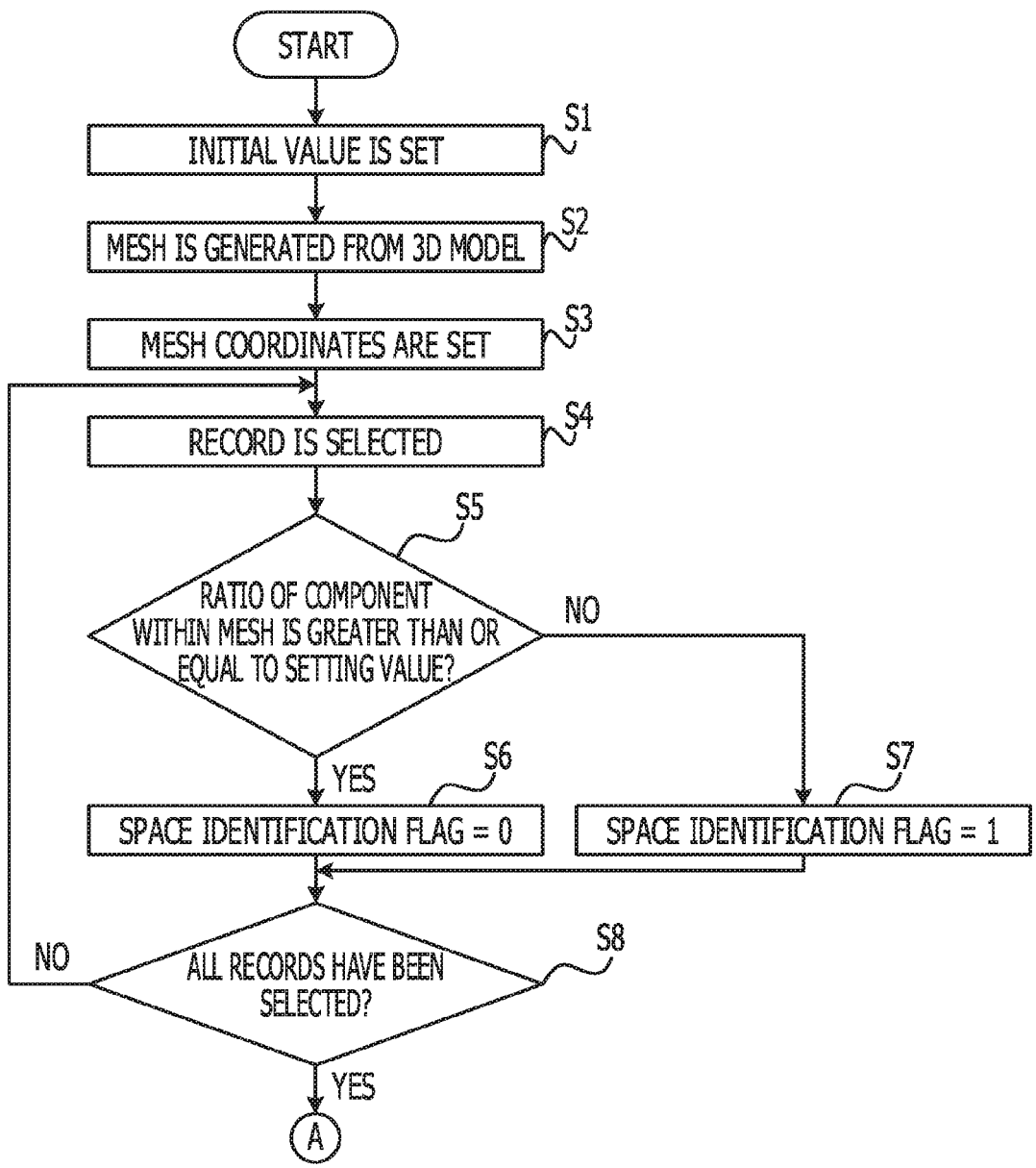
FIG. 8 illustrates an exemplary processing of a design support device.
Figure 9:
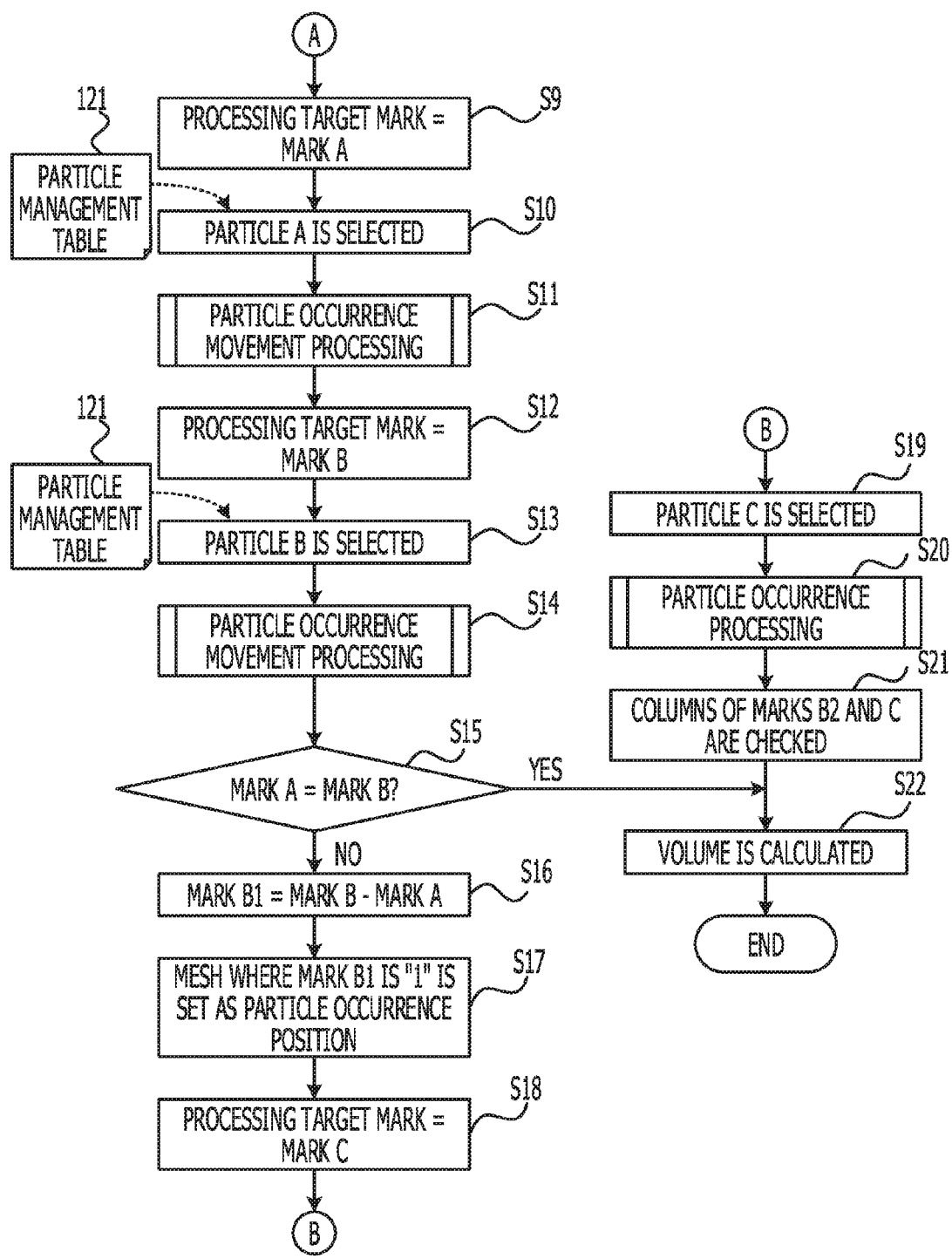
FIG. 9 illustrates an exemplary processing of a design support device.

FIG. 8 and FIG. 9 illustrate an exemplary processing of a design support device. [operation S1] The initial value reception unit 110 stores a received initial value of particle information in the initial value storage unit 120. The processing proceeds to an operation S2.

[operation S2] The mesh generation unit 140 generates a mesh in the input 3D model 20. The processing proceeds to an operation S3.

[operation S3] The mesh generation unit 140 stores the coordinates of the generated mesh in the mesh management table 131. The processing proceeds to an operation S4.

[operation S4] The space classification processor 150 selects one record from the mesh management table 131. The processing proceeds to an operation S5.

[operation S5] The space classification processor 150 determines whether or not the ratio of a component in a mesh of a mesh identification number in the record selected in the operation S4 is greater than or equal to a predetermined setting value. When the ratio of a component is greater than or equal to the predetermined setting value (operation S5: Yes), the processing proceeds to an operation S6. When the ratio of a component is less than the predetermined setting value (operation S5: No), the processing proceeds to an operation S7.

[operation S6] The space classification processor 150 sets "0" (a component) in the column of a space identification flag. The processing proceeds to an operation S8.

[operation S7] The space classification processor 150 sets "1" (a space) in the column of a space identification flag. The processing proceeds to the operation S8.

[operation S8] The space classification processor 150 determines whether or not the processing operations in the operations S5 to S7 have been executed with respect to all records in the mesh management table 131. When the processing operations in the operations S5 to S7 have been executed with respect to all records in the mesh management table 131 (operation S8: Yes), the processing proceeds to an operation S9. When the processing operations in the operations S5 to S7 have not been executed with respect to all records in the mesh management table 131 (operation S8: No), the processing proceeds to the operation S4, and the processing following the operation S4 is subsequently executed.

[operation S9] The particle occurrence unit 160 selects a mark A in the mesh management table 131 as a processing target mark. The processing proceeds to an operation S10.

[operation S10] The particle occurrence unit 160 refers to the particle management table 121 and selects the particle A. The processing proceeds to an operation S11.

[operation S11] The particle movement processor 170 executes particle occurrence movement processing for moving the particle A selected in the operation S10 during a particle movement time. The processing proceeds to an operation S12.

[operation S12] The particle occurrence unit 160 selects a mark B in the mesh management table 131 as a processing target mark. The processing proceeds to an operation S13.

[operation S13] The particle occurrence unit 160 refers to the particle management table 121 and selects the particle B. The processing proceeds to an operation S14.

[operation S14] The particle movement processor 170 executes particle occurrence movement processing for moving the particle B selected in the operation S13 during a particle movement time. The processing proceeds to an operation S15.

[operation S15] The mark identification processor 180 determines whether or not a pattern of values marked in the column of the mark A coincides with a pattern of values marked in the column of the mark B. When the pattern of values marked in the column of the mark A coincides with the pattern of values marked in the column of the mark B (operation S15: Yes), the processing proceeds to an operation S22. When the pattern of values marked in the column of the mark A does not coincide with the pattern of values marked in the column of the mark B (operation S15: No), the processing proceeds to an operation S16.

[operation S16] The mark identification processor 180 sets, in the mark B1, a difference between the mark B and the mark A. The processing proceeds to an operation S17.

[operation S17] The mark identification processor 180 sets, as a particle occurrence position, a mesh where the mark B1 is "1". The processing proceeds to an operation S18.

[operation S18] The particle occurrence unit 160 selects a mark C as a processing target mark. The processing proceeds to an operation S19.

[operation S19] The particle occurrence unit 160 refers to the particle management table 121 and selects a particle C. The processing proceeds to an operation S20.

[operation S20] The particle movement processor 170 executes particle occurrence processing for causing the particle C selected in the operation S19 to occur in the mesh where the mark B1 is "1". The processing proceeds to an operation S21.

[operation S21] The mark identification processor 180 sets, in the column of a mark B2, a difference between the mark B and the mark A. The processing proceeds to an operation S22.

[operation S22] Using the mesh management table 131, the volume calculation unit 190 calculates the volume of each structure.

Figure 10:
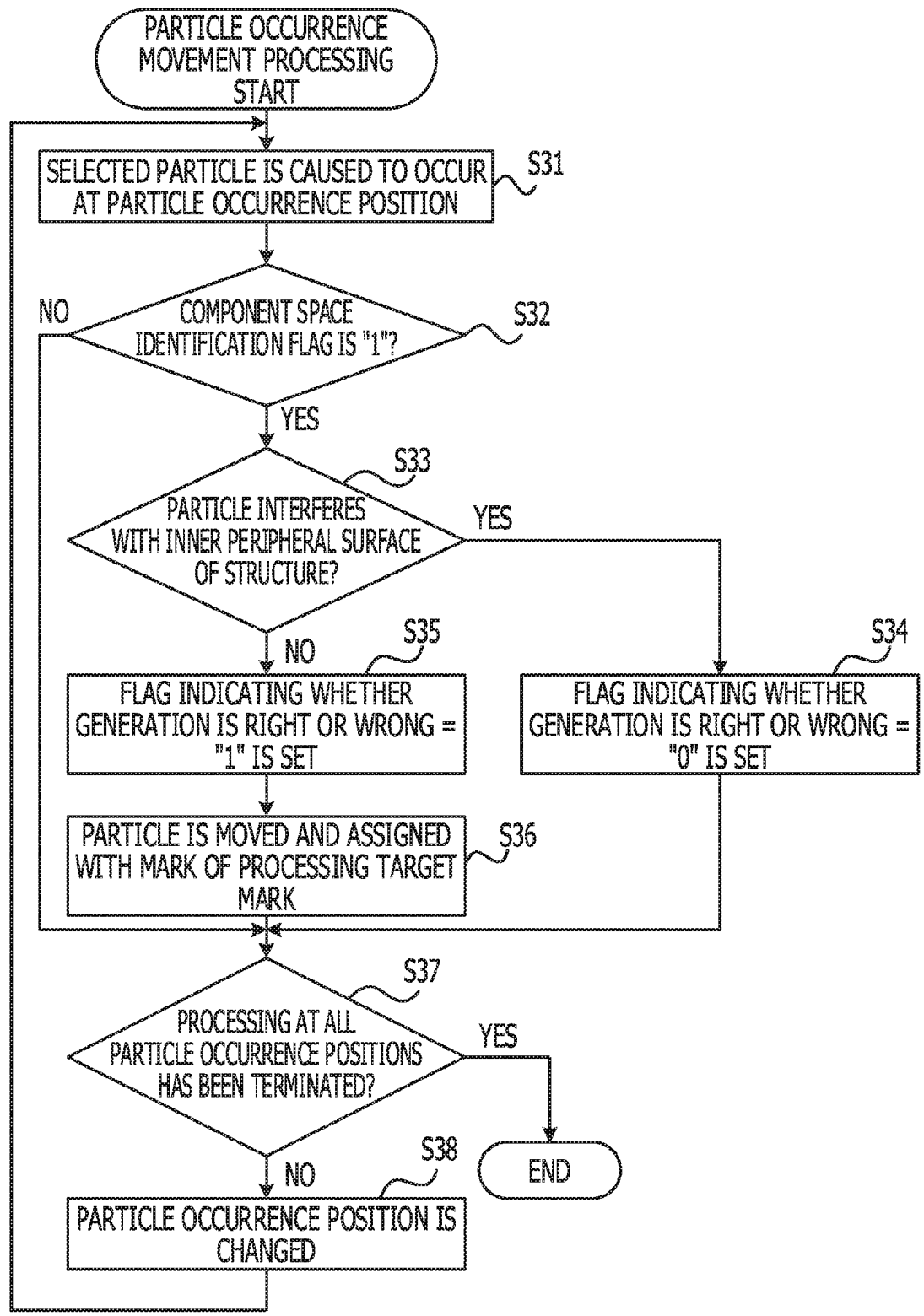
FIG. 10 illustrates an exemplary particle occurrence movement processing.

FIG. 10 illustrates an exemplary particle occurrence movement processing.

[operation S31] The particle occurrence unit 160 causes the particle, which is selected in the operation S10 or the operation S13, to occur so as to be aligned with the center coordinates of a mesh nearest to a particle occurrence position stored in the initial value storage unit 120. The processing proceeds to an operation S32.

[operation S32] The particle occurrence unit 160 refers to the column of a component space identification flag in the mesh management table 131 of a mesh in which the particle caused to occur in the operation S31 is positioned, and the particle occurrence unit 160 determines whether or not the value of the component space identification flag is "1". When the value of the component space identification flag is "1" (operation S32: Yes), the processing proceeds to an operation S33. When the value of the component space identification flag is "0" (operation S32: No), the processing proceeds to an operation S37.

[operation S33] The particle occurrence unit 160 determines whether or not the particle caused to occur in the operation S31 interferes with the inner peripheral surface of a structure. Whether or not the particle interferes with the inner peripheral surface of a structure particle may be determined based on, for example, a comparison of the position coordinates of the particle with the position coordinates of a polygon in the surface of a structure. When the polygon is considerably smaller than the particle, the determination is performed by comparing a maximum or a minimum of each of X, Y, and Z coordinates of the particle, which are obtained from the center coordinates of the particle and the radius of the particle, with the center coordinates of the polygon with respect to each of the X, Y, and Z coordinates.

When the particle caused to occur in the operation S31 interferes with the inner peripheral surface of a structure (operation S33: Yes), the processing proceeds to an operation S34. When the particle caused to occur in the operation S31 does not interfere with the inner peripheral surface of a structure (operation S33: No), the processing proceeds to an operation S35.

[operation S34] The particle occurrence unit 160 sets "0" in the column of a flag indicating whether a particle is generated in the mesh management table 131 that is corresponds to the particle caused to occur in the operation S31. The processing proceeds to an operation S37.

[operation S35] The particle occurrence unit 160 sets "1" in the column of a flag indicating whether the generation of a particle is right or wrong in the mesh management table 131, which corresponding to the particle caused to occur in the operation S31. The processing transits to an operation S36.

[operation S36] The particle movement processor 170 moves the particle caused to occur in the operation S31, and sets "1" in the column of a processing target mark of a mesh identification number where a particle is positioned. The processing proceeds to an operation S37.

[operation S37] The particle movement processor 170 determines whether or not the processing operations in the operations S31 to S36 have been executed with respect to all records in the mesh management table 131. When the processing operations in the operations S31 to S36 have been executed with respect to all records in the mesh management table 131 (operation S37: Yes), the processing illustrated in FIG. 10 is terminated. When the processing operations in the operations S31 to S36 have not been executed with respect to all records in the mesh management table 131 (operation S37: No), the processing proceeds to an operation S38.

[operation S38] The particle occurrence unit 160 changes a particle occurrence position. The processing proceeds to the operation S31, and the processing following the operation S31 is subsequently executed.

In the particle occurrence processing, the operation S36 may be omitted from the particle occurrence movement processing illustrated in FIG. 10. For example, in the particle occurrence processing, after the operation S35 has been executed, the processing proceeds to the operation S37. The particle occurrence position in the particle occurrence processing may correspond to a mesh of a mesh identification number where the column of the mark B1 serving as a marking flag is set to "1".

FIG. 11A to FIG. 11D and FIG. 12A to FIG. 12C illustrate an exemplary process of a design support device.

Figure 11A:
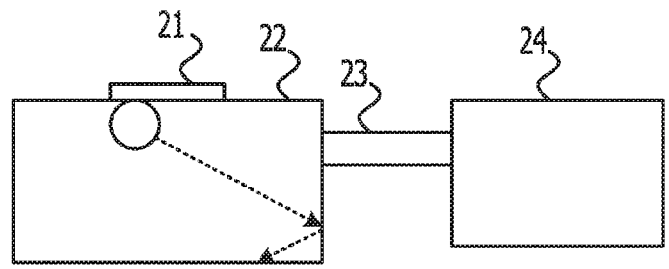
FIG. 11A to FIG. 11D illustrate an exemplary process of a design support device.
Figure 11B:
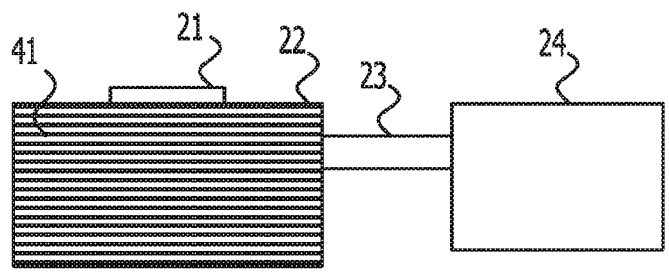

The particle occurrence unit 160 refers to the particle management table 121 and selects the particle A serving as the particle A. As illustrated in FIG. 11A, the particle occurrence unit 160 causes the particle A to occur in a mesh of a mesh identification number 2 in the mesh management table 131, which corresponds to a particle occurrence position (x, y, z=0.0, 0.1, 0.1) stored in the initial value storage unit 120. Since the particle A does not interfere with a mesh serving as a component (for example, a mesh of a mesh identification number 1), recognized by a component space identification flag=0, "1" is set in the column of the particle A of a flag indicating whether a particle is generated, which corresponds to the mesh identification number 2 (a flag indicating whether a particle is generated="1"). The particle movement processor 170 moves the particle A and sets "1" in the column of the mark A where the particle A is positioned. FIG. 11B illustrates a region 41 of a mesh where "1" is set in the column of the mark A. The region of a mesh where "1" is set in the column of the mark A exists within the structure 22 and does not exist within the structure 23 or 24.

Figure 11C:
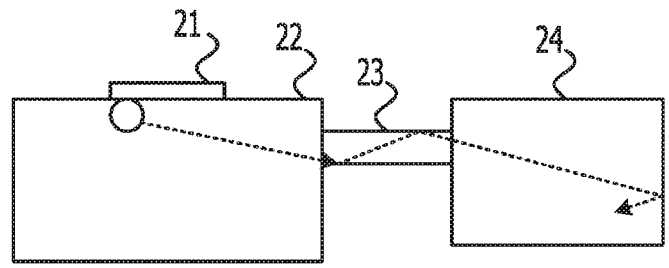
Figure 11D:
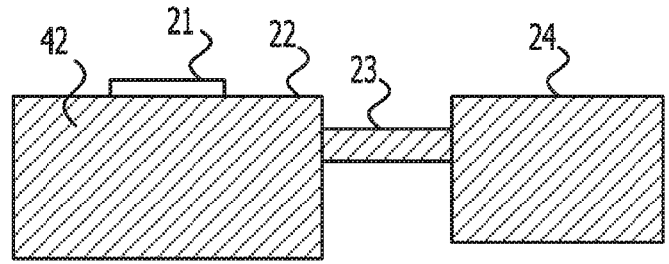

The particle occurrence unit 160 refers to the particle management table 121 and selects the particle B serving as the particle B. As illustrated in FIG. 11C, the particle occurrence unit 160 causes the particle B to occur in a mesh of the mesh identification number 2, which corresponds to a particle occurrence position (x, y, z=0.0, 0.1, 0.1) stored in the initial value storage unit 120. Since the particle B does not interfere with a mesh serving as a component (for example, a mesh of the mesh identification number 1), recognized by a component space identification flag=0, "1" is set in the column of the particle B of a flag indicating whether a particle is generated, which corresponds to the mesh identification number 2 in the mesh management table 131. The particle movement processor 170 moves the particle B and sets "1" in the column of the mark B in the mesh management table 131 where the particle B is positioned. FIG. 11D illustrates a region 42 of a mesh where "1" is set in the column of the mark B. The region 42 of a mesh where "1" is set in the column of the mark B exists within each of the structures 22, 23, and 24.

The mark identification processor 180 determines whether or not all values of the column of the mark A and all values of the column of the mark B coincide with each other. For example, when all values of the column of the mark A and all values of the column of the mark B do not coincide with each other, the mark identification processor 180 sets "1" in a point in the column of the mark B1 where "0" is set in the column of the mark A and "1" is set in the column of the mark B. FIG.

12A illustrates a region 43 of a mesh where "1" is set in the column of the mark B1. The region 43 of a mesh where "1" is set in the column of the mark B1 exists in the structure 23 and the structure 24.

Figure 12A:
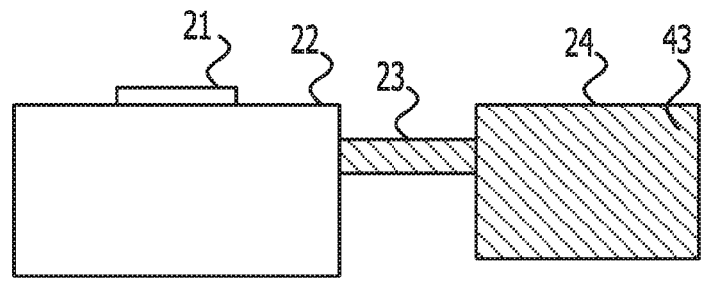
FIG. 12A to FIG. 12C illustrate an exemplary process of a design support device.
Figure 12B:
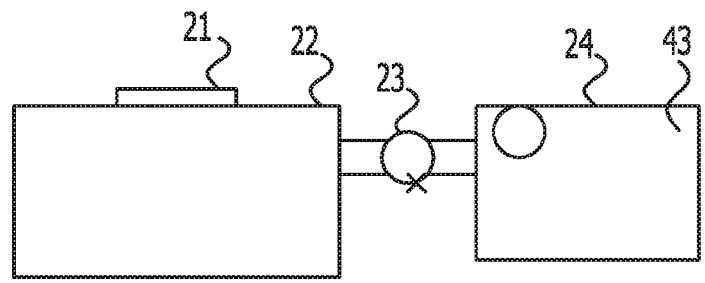

The particle occurrence unit 160 sets, as a particle occurrence position, a mesh where a value in the column of the mark B1 is set to "1". As illustrated in FIG. 12B, the particle occurrence unit 160 causes the particle C whose size is substantially equal to the size of the particle A to occur at a position where a particle occurrence position corresponds to an arbitrary mesh in which "1" is set in the column of the mark B1. For example, when the particle C is caused to occur in a mesh of a mesh identification number 59, since the particle C interferes with the inner peripheral surface of the structure 23 while a value in the column of the component space identification flag is "1", the column of the flag indicating whether a particle is generated is set to "0". When the particle C is caused to occur in a mesh of a mesh identification number 223, since a value in the column of the component space identification flag is "1" and the particle C does not interfere with the inner peripheral surface of the structure 24, the column of the flag C indicating whether a particle is generated is set to "1".

The mark identification processor 180 performs the setting of the flag C indicating whether a particle is generated, with respect to every mesh where a value in the column of the mark B1 is set to "1". When the setting has been terminated, the mark identification processor 180 sets "1" in the column of the mark B2 of a region where "1" is set in the column of the mark B1 and the flag C indicating whether a particle is generated is set to "0".

Figure 12C:
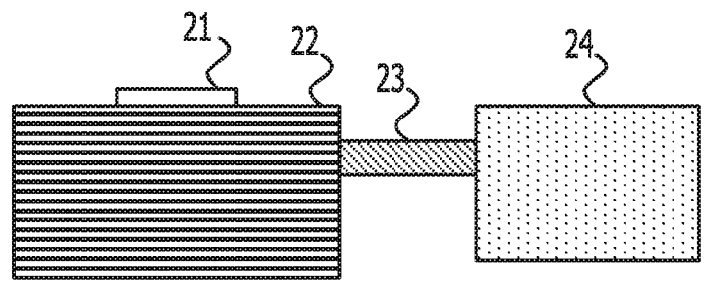

Using a value set in the column of a marking flag in the mesh management table 131, the volume calculation unit 190 calculates the volume of each region. The volume calculation unit 190 counts the number of "1" set in the column of the mark A. A result obtained by multiplying the counted number by the unit volume of a mesh is set as the volume of the structure 22. The volume calculation unit 190 counts the number of "1" set in the column of the mark B2. A result obtained by multiplying the counted number by the unit volume of a mesh is set as the volume of the structure 23. The volume calculation unit 190 counts the number of "1" set in the column of the mark C. A result obtained by multiplying the counted number by the unit volume of a mesh is set as the volume of the structure 24. FIG. 12C illustrates the structures 22, 23, and 24 calculated as different regions.

The volume calculation unit 190 creates a connection relationship diagram 30 between the volumes of the structures 22, 23, and 24. According to the design support device 10, the volume of the structure 22 having a cross-sectional area greater than or equal to a specified size in the 3D model 20 including a joining portion is calculated. Therefore, at the time of designing, a designer recognizes that the structure 22 functions as the rear air chamber of the speaker 21. Since it may be possible for the designer to design again, for example, so that the volume of the structure 22 is enlarged, more accurate acoustic design may be performed in a design stage.

According to the design support device 10, the connection relationship diagram 30 may be easily created. Since it may be possible for the designer to design again, for example, so that the cross-sectional area of the structure 23 is enlarged, more accurate acoustic design may be performed in a design stage.

Figure 13:
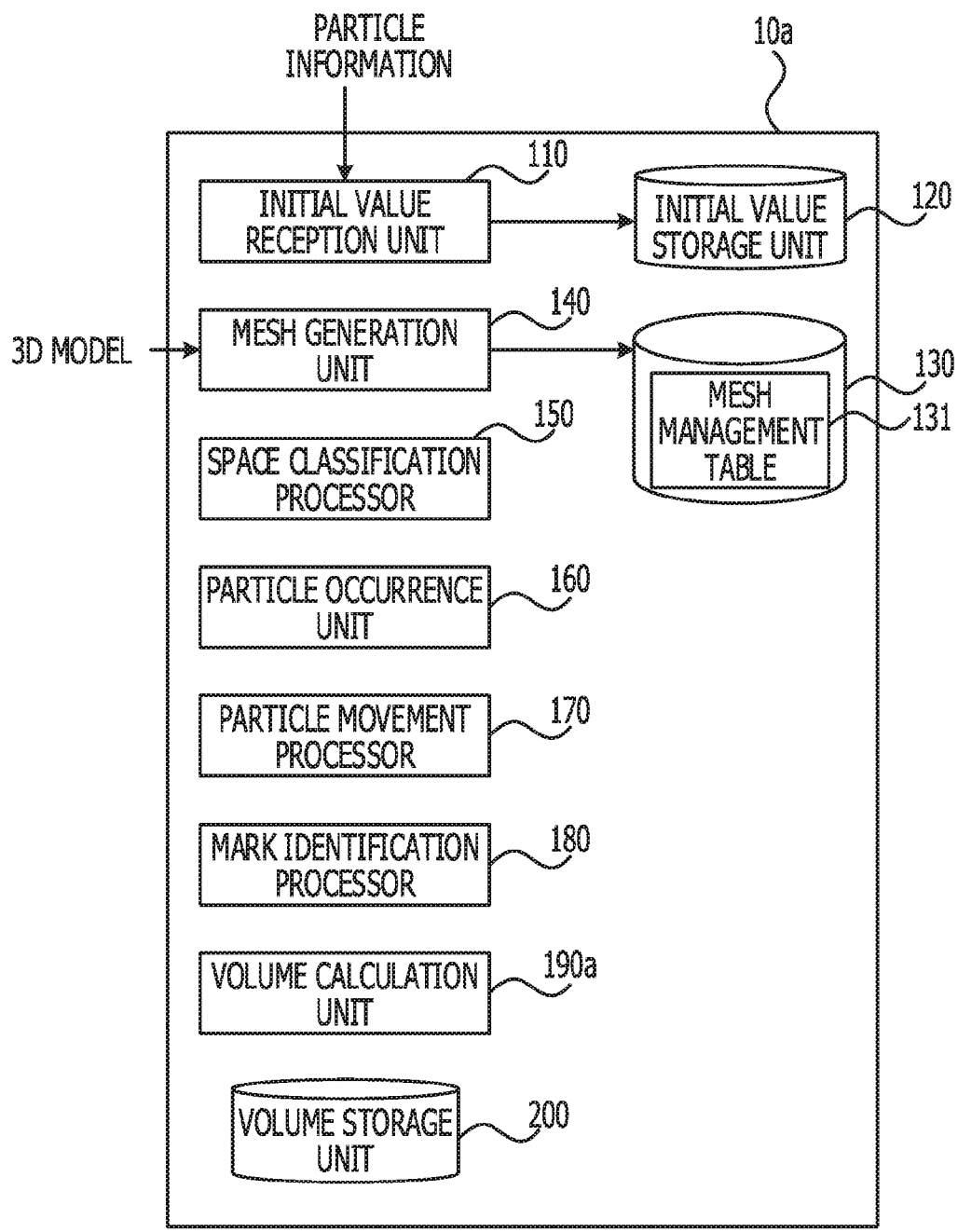
FIG. 13 illustrates an exemplary functional block of a design support device.

FIG. 13 illustrates an exemplary functional block of a design support device. A design support device 10a includes a volume calculation unit 190a where some function is added to the volume calculation unit 190. Other elements illustrated in FIG. 13 may be substantially the same as or similar to elements illustrated in FIG. 4.

At the time of the creation of the connection relationship diagram, the volume calculation unit 190a searches whether or not a region where the mark B2 is set to "1" is a separated space. whether or not a region is a separated space may be searched using, for example, the following method.

Figure 14:
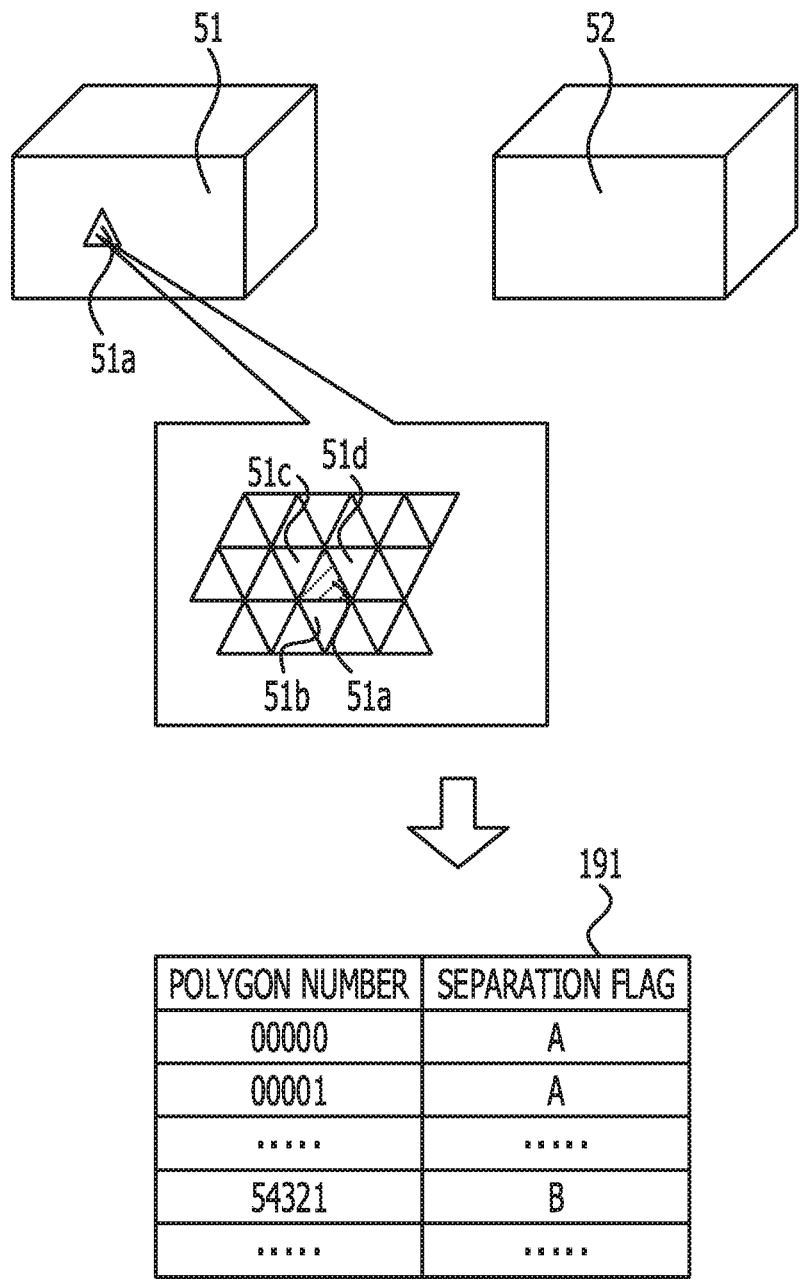
FIG. 14 illustrates an exemplary search method for a separated space.

FIG. 14 illustrates an exemplary search method for a separated space. Structures 51 and 52 illustrated in FIG. 14 indicate examples of a 3D model serving as a design target. The surfaces of the structures 51 and 52 may be expressed using a triangular shaped polygon.

The volume calculation unit 190a includes a management table 191. In the management table 191, the columns of a polygon number and a separation flag are provided. In the column of a polygon number, a number identifying the position of a polygon in the structures 51 and 52 is set. The polygon number may be preliminarily assigned when the structures 51 and 52 are created.

The whole column of a separation flag may be set to "0" when a search for a separated space is started. The volume calculation unit 190a selects a polygon corresponding to an arbitrary number in the column of a polygon number in the management table 191. In FIG. 14, one arbitrary polygon 51a in the surface of the structure 51 may be selected. The volume calculation unit 190a searches for three polygons 51b, 51c, and 51d adjacent to the polygon 51a. The volume calculation unit 190a further searches for three polygons adjacent to the polygons 51b, 51c, and 51d.

In the structure 51, the volume calculation unit 190a may repeat the search for an adjacent polygon and set "A" identifying the structure 51, in the column of a separation flag corresponding to the polygon number of a found polygon.

When an adjacent polygon no longer exists, the volume calculation unit 190a terminates the search for a polygon with respect to the structure 51. At the time of the termination of the search for a polygon, in the management table 191, "A" may be set in the columns of the separation flag corresponding to all polygon numbers of polygons expressing the surface of the structure 51.

When the processing has been completed with respect to the structure 51, the volume calculation unit 190a determines whether or not a polygon number exists where "0" is set in the column of the separation flag in the management table 191. In FIG. 14, "0" may be set in the column of the separation flag corresponding to the polygon number of a polygon expressing the surface of the structure 52. The volume calculation unit 190a selects a polygon corresponding to an arbitrary number in the column of the polygon number where "0" is set in the column of the separation flag in the management table 191. In the structure 52, the search for an adjacent polygon is repeated, and "B" identifying the structure 52 is set in the column of the separation flag corresponding to the polygon number of a found polygon.

When an adjacent polygon no longer exists, the volume calculation unit 190a terminates the search for a polygon with respect to the structure 52. At the time of the termination of the search for a polygon, in the management table 191, "B" may be set in the columns of the separation flag corresponding to all polygon numbers of polygons expressing the surface of the structure 52.

When the processing has been completed with respect to the structure 52, the volume calculation unit 190a determines whether or not a polygon number exists where "0" is set in the column of the separation flag in the management table 191. Since no polygon number exists where "0" is set in the column of the separation flag, the volume calculation unit 190a terminates the search for a separated space.

FIG. 15A to FIG. 15D, FIG. 16A to FIG. 16D, and FIG. 17 illustrate an exemplary processing of a design support device. Processing operations illustrated in FIG. 15A to FIG. 15D, FIG. 16A to FIG. 16D and FIG. 17 may be substantially the same as or similar to processing operations illustrated in FIG. 11A to 11D or FIG. 12A to 12C.

A 3D model 20a may be used. In the 3D model 20a, the hollow structure 26 is joined to the right side of the structure 24 in each of FIG. 15A to FIG. 15D, through the hollow structure 25. Each of the structures 25 and 26 may be a rectangular parallelepiped, and the structure 24 and the structure 26 form a continuous space through the hollow structure 25.

Figure 15A:
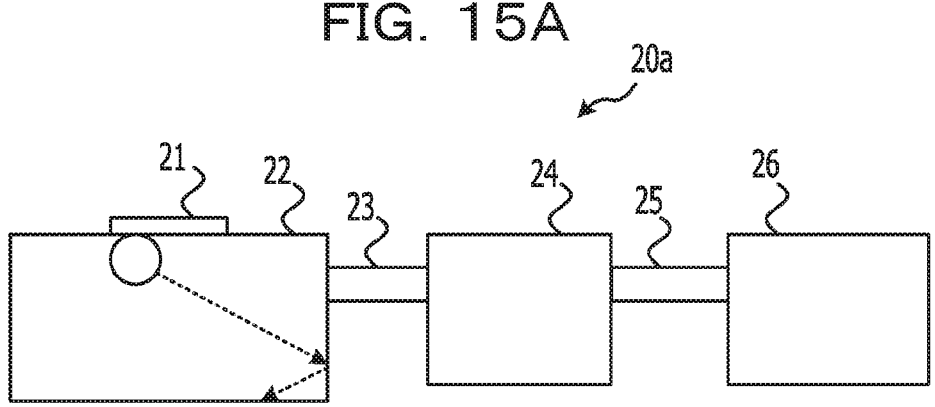
FIG. 15A to FIG. 15D illustrate an exemplary processing of a design support device.
Figure 15B:
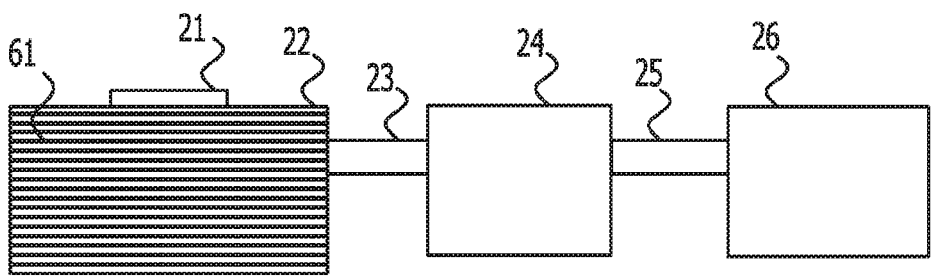
Figure 15C:
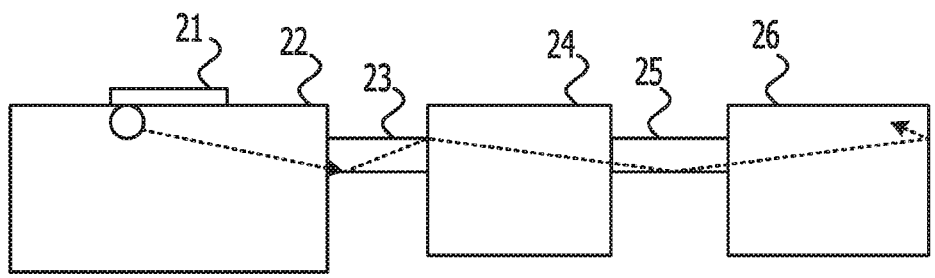
Figure 15D:
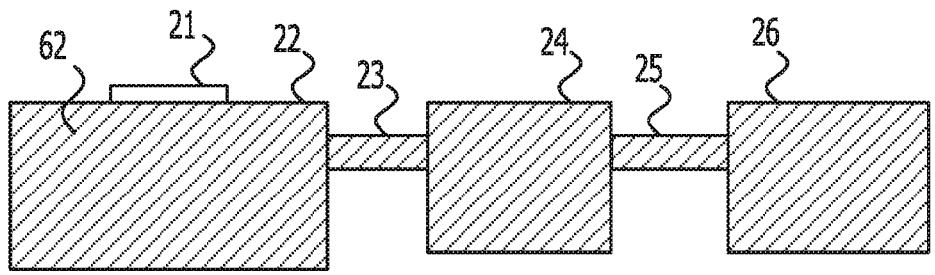
Figure 16A:
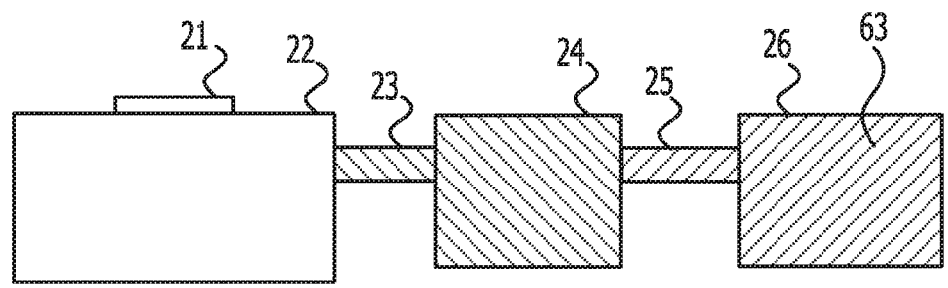
FIG. 16A to FIG. 16D illustrate an exemplary processing of a design support device.

As illustrated in FIG. 15A, the particle A caused to occur is moved, and "1" is set in the column of the mark A in the mesh management table 131 where the particle A is positioned. FIG. 15B illustrates a region 61 of a mesh where "1" is set in the column of the mark A. As illustrated in FIG. 15C, the particle B caused to occur is moved, and "1" is set in the column of the mark B in the mesh management table 131 where the particle B is positioned. FIG. 15D illustrates a region 62 of a mesh where "1" is set in the column of the mark B. The mark identification processor 180 sets "1" in a point in the column of the mark B1 where "0" is set in the column of the mark A and "1" is set in the column of the mark B. FIG. 16A illustrates a region 63 of a mesh where "1" is set in the column of the mark B1.

Figure 16B:
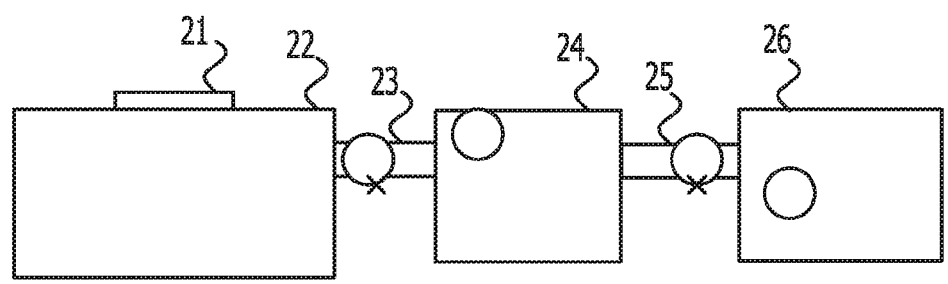
Figure 16C:
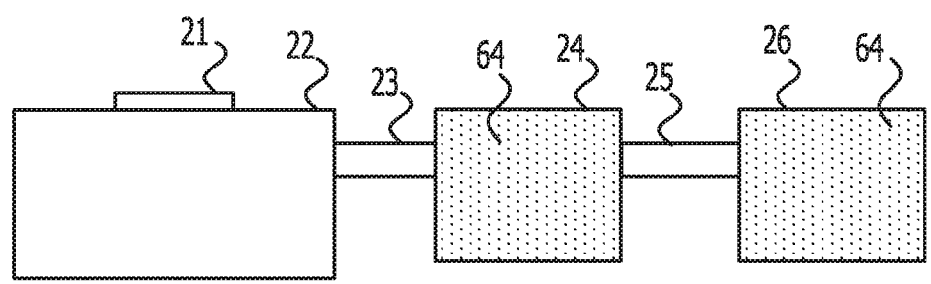
Figure 16D:
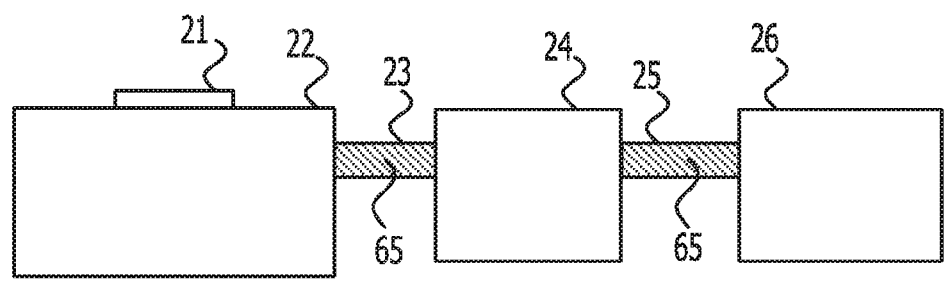

As illustrated in FIG. 16B, the particle occurrence unit 160 sets, as a particle occurrence position, a mesh where a value in the column of the mark B1 is set to "1". The mark identification processor 180 performs the setting of the flag C indicating whether a particle is generated, with respect to every mesh where a value in the column of the mark B1 is set to "1". FIG. 16C illustrates a region 64 of a mesh where "1" is set in the column of the mark C. When the setting has been terminated, the mark identification processor 180 sets "1" in the column of the mark B2 of a region where "1" is set in the column of the mark B1 and the flag C indicating whether a particle is generated is set to "0". FIG. 16D illustrates a region 65 of a mesh where "1" is set in the column of the mark B2.

Next, using a value set in the column of a marking flag in the mesh management table 131, the volume calculation unit 190 calculates the volume of each region. The volume calculation unit 190 counts the number of "1" set in the column of the mark A. A result obtained by multiplying the counted number by the unit volume of a mesh is set as the volume of the structure 22.

By referring to the management table 191, the volume calculation unit 190 searches whether or not a space separated with respect to the mark B2 exists. Since the space separated with respect to the mark B2 exists, the volume calculation unit 190a assigns a serial number to a mark with respect to each separated space. FIG. 17 illustrates a region 65a to which a mark B21 is assigned with respect to the mark B2 and a region 65b to which a mark B22 is assigned.

The volume calculation unit 190a individually counts the number of "1" set in the column of the mark B21 and the number of "1" set in the column of the mark B22. A result obtained by multiplying the counted number by the unit volume of a mesh is set as each of the volumes of the structures 23 and 25.

By referring to the management table 191, the volume calculation unit 190 searches whether or not a space separated with respect to the mark C exists. Since the space separated with respect to the mark C exists, the volume calculation unit 190a assigns a serial number to a mark with respect to each separated space. FIG. 17 illustrates a region 64a to which a mark C1 is assigned with respect to the mark C and a region 64b to which a mark C2 is assigned. The number of "1" set in the column of the mark C1 and the number of "1" set in the column of the mark C2 are individually counted. A result obtained by multiplying the counted number by the unit volume of a mesh is set as each of the volumes of the structures 24 and 26.

The volume calculation unit 190 creates a connection relationship diagram 70 among the volumes of the structures 22 to 26. The sizes of regions 71, 72, 73, 74, and 75 in the connection relationship diagram 70 indicate the ratios of the volumes of the structures 22, 23, 24, 25, and 26, respectively. Numbers within the regions 71, 72, 73, 74, and 75 indicate the volumes of the structures 22, 23, 24, 25, and 26, respectively.

According to the design support device 10a, the same advantageous effect as the design support device 10 may be obtained. According to the design support device 10a, a separated space may be recognized.

The processing performed by the design support device 10 or 10a may be distributed and executed by a plurality of devices. For example, one device may set a value in each column in the mesh management table 131, and another device may calculate the volume of a structure in the 3D model using the mesh management table 131.

Two or more arbitrary configurations (features) described above may be combined. The above-mentioned processing may be executed by a computer. A program is provided where a processing content to be executed by the design support device 1 or 10 is described. The program is executed by the computer, and hence, the processing is executed on the computer. The program where a processing content is described may be recorded in a computer-readable recording medium. The computer-readable recording medium may include a magnetic storage device, an optical disk, a magneto-optical recording medium, a semiconductor memory, or the like. The magnetic storage device may include a hard disk drive, a flexible disk (FD), a magnetic tape, or the like. The optical disk may include a DVD, a DVD-RAM, a CD-ROM/RW, or the like. The magneto-optical recording medium may include a Magneto-Optical disk (MO) or the like.

When the program is distributed, portable recording media such as DVDs or CD-ROMs are marketed where the program is recorded, for example. The program may be stored in a storage device in a server computer and the program may be transferred from the server computer to another computer through a network.

A computer executing the program stores, in a self-storage device, for example, the program recorded in a portable recording medium or the program transferred from the server computer. The computer reads out the program from the self-storage device and executes processing according to the program. The computer may also execute processing according to the program directly read out from the portable recording medium. The computer may also execute processing according to a received program every time the program is transferred from a server computer connected through a network.

At least a portion of the above-mentioned processing may also be executed in an electronic circuit such as a Digital Signal Processor (DSP), an Application Specific Integrated Circuit (ASIC), or a Programmable Logic Device (PLD).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A design support method comprising:
executing, by a computer, operations of:
separating an internal space of a three-dimensional model of a design target into meshes, the three-dimensional model including structures;
placing a first particle having a first diameter in a specified particle occurrence position of the meshes;
moving, in a first arbitrary direction, the first particle in the meshes while classifying each of the meshes into a space or a component;
recording a first movement trace of the first particle by checking a presence or an absence of the first particle in each of the meshes;
placing a second particle having a second diameter different from the first diameter in the specified particle occurrence position of the meshes;
moving, in a second arbitrary direction, the second particle in the meshes while classifying each of the meshes into the space or the component;
recording a second movement trace of the second particle by checking a presence or an absence of the second particle in each of the meshes; and
calculating a first volume of a first structure of the structures by comparing the first movement trace and the second movement trace.

2. The design support method according to claim 1, wherein
the structures include the first structure and a second structure coupled to the first structure through a joining portion.

3. The design support method according to claim 2, wherein the first volume is calculated by multiplying a unit volume of one of the meshes by a value obtained by a subtraction of a first number of the presence in the first movement trace from a second number of the presence in the second movement trace.

4. The design support method according to claim 3, further comprising:
placing a third particle having a third diameter different from the second diameter in one or more sub-meshes that do not have the presence in the first movement trace, have the presence in the second movement trace, and are included in the meshes;
moving, in a third arbitrary direction, the third particle in the one or more sub-meshes while checking an interference or a not-interference of the third particle with an inner periphery of the second structure and the joining portion; and
recording a third movement trace of the third particle.

5. The design support method according to claim 4, wherein the checking the interference or the not-interference is performed by comparing position coordinates of the third particle with position coordinates of the inner periphery of the second structure and the joining portion.

6. The design support method according to claim 4, further comprising:
calculating a second volume of the second structure by multiplying the unit volume by a value obtained by a subtraction of a second number of interferences in the third movement trace from the one or more sub-meshes.

7. The design support method according to claim 4, further comprising:
calculating a third volume of the joining portion by multiplying the unit volume by a value obtained by a subtraction of a third number of not-interferences in the third movement trace from the one or more sub-meshes.

8. The design support method according to claim 1, wherein the first diameter is larger than the second diameter.

9. A non-transitory recording medium recording therein a program causing a computer to execute operations, the operations comprising:
separating an internal space of a three-dimensional model of a design target into meshes, the three-dimensional model including structures;
placing a first particle having a first diameter in a specified particle occurrence position of the meshes;
moving, in a first arbitrary direction, the first particle in the meshes while classifying each of the meshes into a space or a component;
recording a first movement trace of the first particle by checking a presence or an absence of the first particle in each of the meshes;
placing a second particle having a second diameter different from the first diameter in the specified particle occurrence position of the meshes;
moving, in a second arbitrary direction, the second particle in the meshes while classifying each of the meshes into the space or the component;
recording a second movement trace of the second particle by checking a presence or an absence of the second particle in each of the meshes; and
calculating a first volume of a first structure of the structures by comparing the first movement trace and the second movement trace.

10. The non-transitory recording medium according to claim 9, wherein
the structures include the first structure and a second structure coupled to the first structure through a joining portion.

11. The non-transitory recording medium according to claim 10,
wherein the first volume is calculated by multiplying a unit volume of one of the meshes by a value obtained by a subtraction of a first number of the presence in the first movement trace from a second number of the presence in the second movement trace.

12. The non-transitory recording medium according to claim 11, further comprising:
placing a third particle having a third diameter different from the second diameter in one or more sub-meshes that do not have the presence in the first movement trace, have the presence in the second movement trace, and are included in the meshes;
moving, in a third arbitrary direction, the third particle in the one or more sub-meshes while checking an interference or a not-interference of the third particle with an inner periphery of the second structure and the joining portion; and
recording a third movement trace of the third particle.

13. The non-transitory recording medium according to claim 12, further comprising:
calculating a second volume of the second structure by multiplying the unit volume by a value obtained by a subtraction of a second number of interferences in the third movement trace from the one or more sub-meshes.

14. A design support device comprising:
a processor configured to execute a program and
a memory configured to store the program,
wherein the processor, based on the program, performs operations to:
- separate an internal space of a three-dimensional model of a design target into meshes, the three-dimensional model including structures;
- place a first particle having a first diameter in a specified particle occurrence position of the meshes;
- move, in a first arbitrary direction, the first particle in the meshes while classifying each of the meshes into a space or a component;
- record a first movement trace of the first particle by checking a presence or an absence of the first particle in each of the meshes;
- place a second particle having a second diameter different from the first diameter in the specified particle occurrence position of the meshes;
- move, in a second arbitrary direction, the second particle in the meshes while classifying each of the meshes into the space or the component;
- record a second movement trace of the second particle by checking a presence or an absence of the second particle in each of the meshes; and
- calculate a first volume of a first structure of the structures by comparing the first movement trace and the second movement trace.

15. The design support device according to claim 14, wherein
the structures include the first structure and a second structure coupled to the first structure through a joining portion.

16. The design support device according to claim 15, wherein the first volume is calculated by multiplying a unit volume of one of the meshes by a value obtained by a subtraction of a first number of the presence in the first movement trace from a second number of the presence in the second movement trace.

17. The design support device according to claim 16, wherein the processor:
- places a third particle having a third diameter different from the second diameter in one or more sub-meshes that do not have the presence in the first movement trace, have the presence in the second movement trace, and are included in the meshes;
- moves, in a third arbitrary direction, the third particle in the one or more sub-meshes while checking an interference or a not-interference of the third particle with an inner periphery of the second structure and the joining portion; and
- records a third movement trace of the third particle.

18. The design support device according to claim 17, wherein the processor:
- calculates a second volume of the second structure by multiplying the unit volume by a value obtained by a subtraction of a second number of interferences in the third movement trace from the one or more sub-meshes.

* * * * *